No. 651,116. Patented June 5, 1900.
O. O. OZIAS.
PRICE COMPUTING SCALE.
(Application filed Aug. 23, 1895.)

(No Model.) 2 Sheets—Sheet 1.

WITNESSES
Frak Koehn
A. M. Watson

INVENTOR
Orange O. Ozias

No. 651,116. Patented June 5, 1900.
O. O. OZIAS.
PRICE COMPUTING SCALE.
(Application filed Aug. 23, 1895.)

(No Model.) 2 Sheets—Sheet 2.

UNITED STATES PATENT OFFICE.

ORANGE O. OZIAS, OF DAYTON, OHIO.

PRICE-COMPUTING SCALE.

SPECIFICATION forming part of Letters Patent No. 651,116, dated June 5, 1900.

Application filed August 23, 1895. Serial No. 560,271. (No model.)

*To all whom it may concern:*

Be it known that I, ORANGE O. OZIAS, of Dayton, in the county of Montgomery and State of Ohio, have invented certain new and useful Improvements in Price - Computing Scales; and I do hereby declare the following to be a full, clear, and exact description of the same, reference being had to the accompanying drawings, forming a part of this specification, and to the letters of reference marked thereon.

This invention relates to that class of computing-scales wherein a movable poise is employed with a plurality of graduations representing different values, by which mechanism weight and values are indicated together, the weight by said poise and the value by said graduations.

The present invention has for its object to improve the construction and increase the capacity, utility, and compactness of computing-scales whereby they are rendered more effective in operation, the values are indicated more distinctly, and the neat and compact form obtained renders them more desirable by reason of the small space required in proportion to the capacity in weight and values.

Heretofore in machines of this character with which I am familiar the beams of computing-scales have been provided with a plurality of value - indicating graduations arranged to extend between the supporting-pivot of said beam and its outer or counterpoise pivot, said value graduations being carried directly by or adjacent to said beam and independent thereof. My present invention is believed to involve a new and novel construction in this class of machines by reason of the fact that the value-indicating graduations are arranged on a member or tablet arranged to extend on both sides of the beam-supporting pivots substantially the full length of the scale beam or lever and supported in extensions or arms on the beam; which novel construction greatly increases the compactness of scales of proportionately-large capacity and renders the value graduations clear, distinct, and uncrowded.

The improvement furthermore consists in new and novel structures and combinations and arrangements of the parts, as hereinafter described, and more fully pointed out in the annexed claims.

Figure 1:
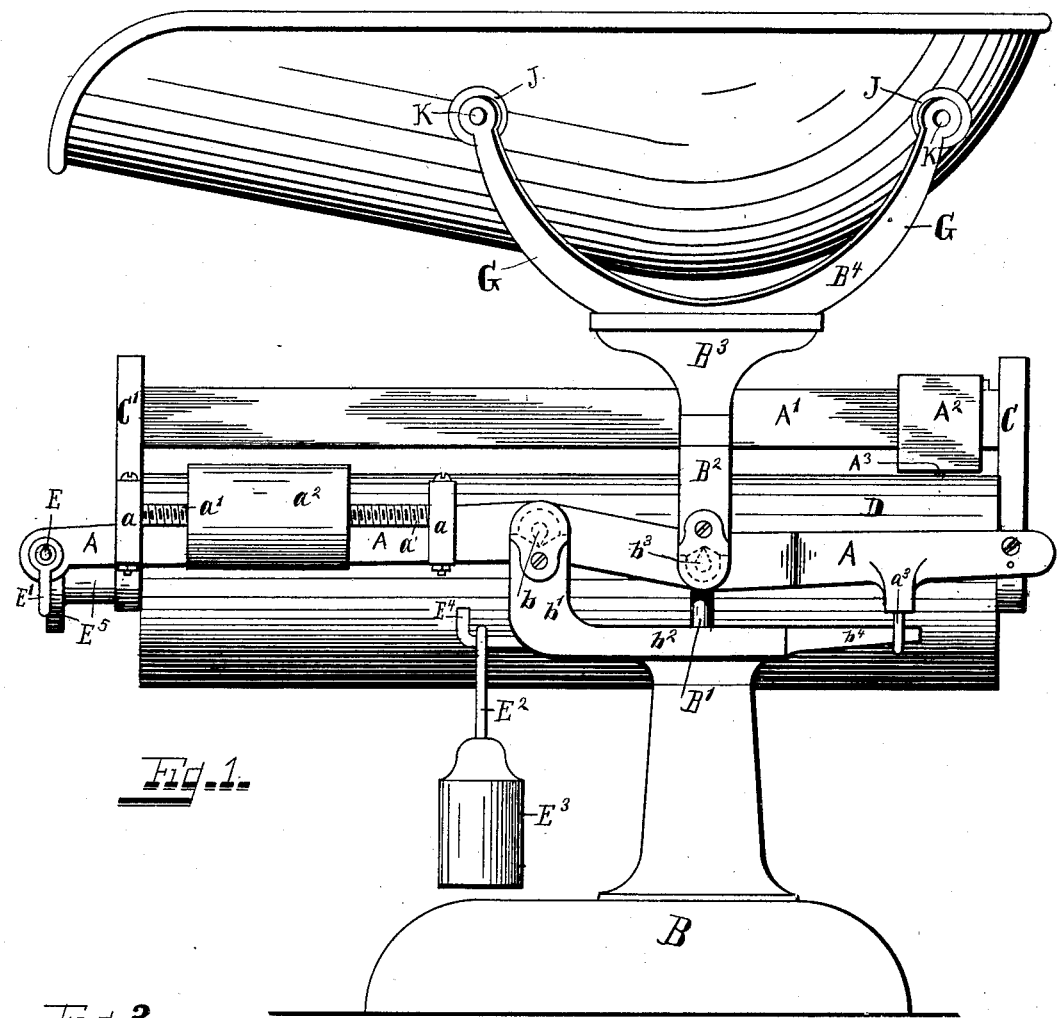
Figure 3:
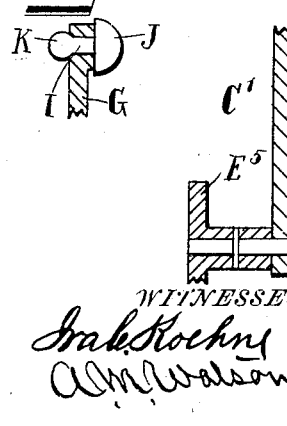
Figures 2, 4:
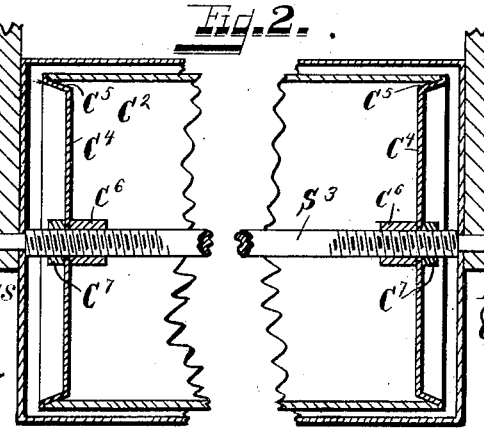
Figure 5:
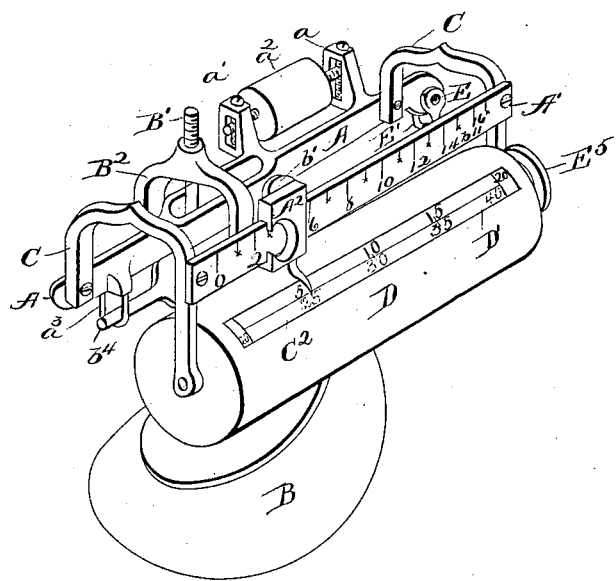

Referring to the drawings, Figure 1 is a rear elevation of a simple even-balanced scale embodying my invention. Fig. 2 is a sectional view of the computing-cylinder and the means for mounting it. Figs. 3 and 4 illustrate details of construction, and Fig. 5 is a reverse perspective view of the scale with the weight-receiving member removed from the threaded top of its securing-rod $B'$.

Like characters of reference are employed throughout the description and drawings to designate identical parts.

In the drawings, A represents the scale beam or lever provided on opposite sides with knife-edge bearings $b$, resting in hardened seats in upwardly-extending arms $b'$ of cap $b^2$, secured to the top of the column of base-piece B. The beam A is bifurcated or formed with an opening extending vertically therethrough at the central portion of said beam for separating the knife-edge bearings $b$, and thus bringing their hardened seats at some distance from the longitudinal center of said beam A. The opening formed by beam A being bifurcated also admits of the passage of a vertical rod $B'$, supported by a rigid bifurcated casting $B^2$, having hardened seats in its downwardly-extending arms to receive knife-edge bearings $b^3$, rigidly secured in beam A. This casting $B^2$ is surmounted by a preferably-circular cap-piece $B^3$, to which the scoop-retaining spider $B^4$ is secured in the instance shown, or to which a platform may be directly secured when desired. The rod $B'$ extends downward through the hollow column and into the cavity usually formed in the base B, where said rod is provided with a gravity-weight or pivoted to a retaining-lever, which in turn is pivoted to said base or other well-known means for maintaining the vertical alinement of rod $B'$.

To the left (in Fig. 1) of the supporting-pivots of beam A said beam is provided with laterally-extending arms $a$, carrying a threaded screw $a'$, upon which is mounted in the usual manner a balance-poise $a^2$, as shown. To the left of the supporting-pivots of beam A said beam is provided with a loop $a^3$, engaging with a projection $b^4$ of cap $b^2$ for limiting the movement of said beam.

The beam proper, A, is provided with a graduated bar or supplemental beam A', upon which a poise slides and is adapted to indicate weight. The graduated bar may be attached to and supported by the beam A in any suitable manner; but I preferably arrange at the ends of the beam A extensions C, projecting forward and having their ends arranged vertically for a purpose to be presently explained, and the graduated bar is attached to and supported by these extensions. Such arrangement, in effect, forms a rigid structure, the whole of which may be said to constitute the beam, and at each end thereof or on opposite sides of the pivotal center the said beam is provided with vertically-arranged extensions, formed by the ends of the parts C, and between these vertically-arranged extensions I journal the rotary member carrying the sets of graduations for indicating the cost of articles weighed. In the preferred arrangement the rotary member is in the form of a cylinder having peripheral graduations and marks indicating the cost of articles at different rates per unit—as shown, for instance, in the patent to Kepler, No. 514,475—although any desired markings may be used.

I prefer to form cylinder $C^2$ of paper or other material of such thickness as to give the proper degree of stability to said cylinder, or to employ thin paper or material and reinforce it with one or more thicknesses of like or unlike material to render said cylinder stiff enough to maintain a substantially-uniform contour.

The preferred manner of mounting cylinder $C^2$ is upon headpieces $C^4$, at opposite ends provided with circumferential tapering flanges $C^5$ to accommodate the slightly-varying diameters of said cylinder and to prevent said headpieces from passing completely into the bore of said cylinder. The headpieces $C^4$ I prefer to make of spun or stamped metal, with a cast bushing or hub $C^6$ secured thereto. The hubs $C^6$ of headpieces $C^4$ are screw-threaded and are adjustably mounted upon shaft $S^3$ by engaging the screw-threads formed near both ends of said shaft, while said headpieces $C^4$ are rigidly held in the desired position by lock-nuts $C^7$, in contact with their hubs $C^6$. The shaft $S^3$ is held from longitudinal movement by having its ends bearing in frames C C', smaller in diameter than the central body of said shaft. The object of this adjustment will be hereinafter fully referred to.

Completely enveloping the cylinder $C^2$ is a covering D, rigidly secured to the frames C C' and provided with a longitudinal aperture D', through which the graduations or characters on cylinder $C^2$ are exposed to view. The graduated bar or supplemental beam A' is provided with a sliding poise $A^2$, adapted to indicate weight, said poise $A^2$ being also provided with a downwardly-extending hand or pointer $A^3$ to indicate the proper value graduation appearing in aperture D'.

As the weight-indicating beam and the value-indicating cylinder are independent, when assembling the manufactured parts great difficulty is experienced in readily securing the proper alinement between the weight and value graduations in order that the weight and value may both be indicated correctly. This difficulty I prefer to overcome by adjustably mounting the cylinder $C^2$ upon its shaft $S^3$, preferably in the manner shown and described, although any other form of adjustment may be employed with equal effectiveness any without departure from the spirit of the invention as involved in this feature of the improvement.

To facilitate the operation of the scales manufactured under Letters Patent No. 514,475, I provide at the extreme left of beam A, Fig. 1, a knife-edge pivot E, supporting a loop E', which loop may receive the hooked rod $E^2$, carrying its integral counterweight $E^3$ when weighing and computing articles of high value. When weighing and computing articles of low value, the hooked rod $E^2$, with its integral counterweight $E^3$, may be supported by a projection $E^4$ of cap $b^2$.

One end of shaft $S^3$ projects beyond one of the frames C C' and has secured thereto a thumb-nut or hand-wheel $E^5$ for the purpose of revolving cylinder $C^2$, secured to said shaft.

To those conversant with this art it is evident that in the operation of this device the weight of an article is indicated by the beam A', and also by the removable counterweight $E^3$, when said weight is employed, while the values of predetermined quantities of an article at the desired price per pound are exposed to view through aperture D', and the particular value of said article designated in each instance by pointer $A^3$ on poise $A^2$.

The scoop-retaining spider $B^4$ is provided with upwardly-diverging arms G, having apertures in their extreme ends for receiving the shanks I of and projecting from enlarged rubber or felt tips J, the remaining ends of said shanks I being provided with a slightly-enlarged portion K. The shanks I are of uniform diameter for a distance equal to the thickness of arms G, in order that said enlarged portion K thereof may be forced through the aperture, and in expanding to its normal size said enlarged portion K firmly secures the enlarged rubber or felt tips J to the arms G of spider $B^4$. These tips J prevent the marring of the scoop and lessen the jars upon the knife-edge pivots.

Having now described my invention, what I claim as new, and pray to secure by Letters Patent, is—

1. In a price-scale the combination with a beam pivot-bearings on opposite sides of the beam intermediate its ends and a goods-support pivotally connected with the beam at one side of its pivotal axis by bearings also located on opposite sides of the beam of arms rigid with the beam located on opposite ends of the beam and at opposite points with respect to the axis of the beam and axis of the goods-support connection and extending in planes at right angles to the length of the beam, a member having computations of value thereon journaled between said arms to rotate on an axis at right angles to the axis of the beam and a poise for registering with said graduations; substantially as described.

2. In a price-scale the combination with a beam having two pairs of knife-edge bearings intermediate the ends of the beam one knife-edge of each pair projecting on each side of the beam, the pairs having their edges oppositely arranged and in substantially the same horizontal plane, arms projecting from the ends of the beam outside of the said bearings whereby said bearings are located in transverse planes between the transverse planes of the arms, a rotary member having computations of value thereon journaled in said arms and a poise for registering with said computations, of a base having upwardly-extending arms in which one pair of said knife-edges rest to support the beam together with the rotary value-indicating member, a goods-support and bearings connected therewith coöperating with the other pair of knife-edges on the beam; substantially as described.

3. In a price-scale, the combination with a beam having arms at the ends projecting in planes transverse to the length of the beam, and a rotary value-indicating member journaled in said arms, of two pairs of knife-edge bearings carried by the beam at points intermediate the arms, one knife-edge of each pair projecting from each side of the beam, a base having upwardly-extending arms provided with bearings in which one pair of said knife-edges rest to form the axial support of the beam, a goods-support, a vertically-extending rod, bearings connected therewith and coöperating with the other pair of knife-edges and a poise for registering with the value graduations; substantially as described.

4. In a price-scale, the combination with a beam having arms at the ends projecting in planes transverse to the length of the beam, and a rotary value-indicator journaled in said arms at one side of the vertical plane in which the beam is located, of two pairs of knife-edge bearings carried by the beam at points intermediate said arms, one knife-edge of each pair projecting from each side of the beam, a base having bearings with which one pair of said knife-edges coöperate to form the axis of the beam, a goods-support located above and in the vertical plane of the beam, bearings connected with said support and coöperating with the other pair of knife-edges, means for retaining the goods-support in its vertical position and a poise for registering with the value graduations; substantially as described.

5. The combination of beam A carrying pivots $b$ and $b^3$, said beam being bifurcated at its central portion to permit the passage of rod B' therethrough; seats for pivots $b$ in arms $b'$ of cap $b^2$ carried by base B; seats for pivots $b^3$ in the downwardly-diverging arms of casting $B^2$ supporting rod B'; a cap-piece $B^3$ surmounting casting $B^2$ and adapted to secure the weight-receiving member; means for limiting the movement of beam A, and a weight-indicating beam and poise carried by lateral extensions on said beam, substantially as specified.

6. The combination of beam A carrying pivots $b$ and $b^3$, said beam being bifurcated at its central portion to permit the passage of rod B' therethrough; seats for pivots $b$ in arms $b'$ of cap $b^2$ carried by the column of base B; seats for pivots $b^3$ in the downwardly-diverging arms of casting $B^2$ supporting rod B'; a cap-piece $B^3$ surmounting casting $B^2$; a scoop-retaining spider $B^4$ secured above cap-piece $B^3$; a loop $a^3$ on beam A engaging projection $b^4$ of cap $b^2$ for limiting the movement of beam A; substantially as specified.

7. The combination of a beam A carrying pivots $b$ and $b^3$, said beam being bifurcated at its central portion to permit the passage of rod B' therethrough; seats for pivots $b$ in arms $b'$ of cap $b^2$ carried by the column of base B; seats for pivots $b^3$ in the downwardly-diverging arms of casting $B^2$ supporting rod B'; a cap-piece $B^3$ surmounting casting $B^2$ and adapted to retain the weight-receiving member; a loop $a^3$ on beam A engaging projection $b^4$ of cap $b^2$ for limiting the movement of beam A; laterally-extending arms $a$ on beam A and carrying screw $a'$ provided with balance-poise $a^2$; laterally-extending frames C, C', carried by beam A; a value-indicating cylinder revolubly pivoted in said frames, a weight-graduated beam A' secured to said frames adjacent to said cylinder, a poise $A^2$ sliding on beam A' and a pointer $A^3$ carried by said poise and adapted to designate the correct value on said cylinder, substantially as specified.

8. The combination of the spider $B^4$ retaining a scoop with its upwardly-diverging arms G, each of said arms being provided with apertures H receiving the shanks I projecting therethrough from enlarged tips J of yielding material, and an enlarged portion K formed on the end of shanks I, the distance between tips J and portion K being substantially equal to the thickness of arms G; substantially as specified.

ORANGE O. OZIAS.

In presence of—
IRA C. KOEHNE,
E. CANBY.